United States Patent Office.

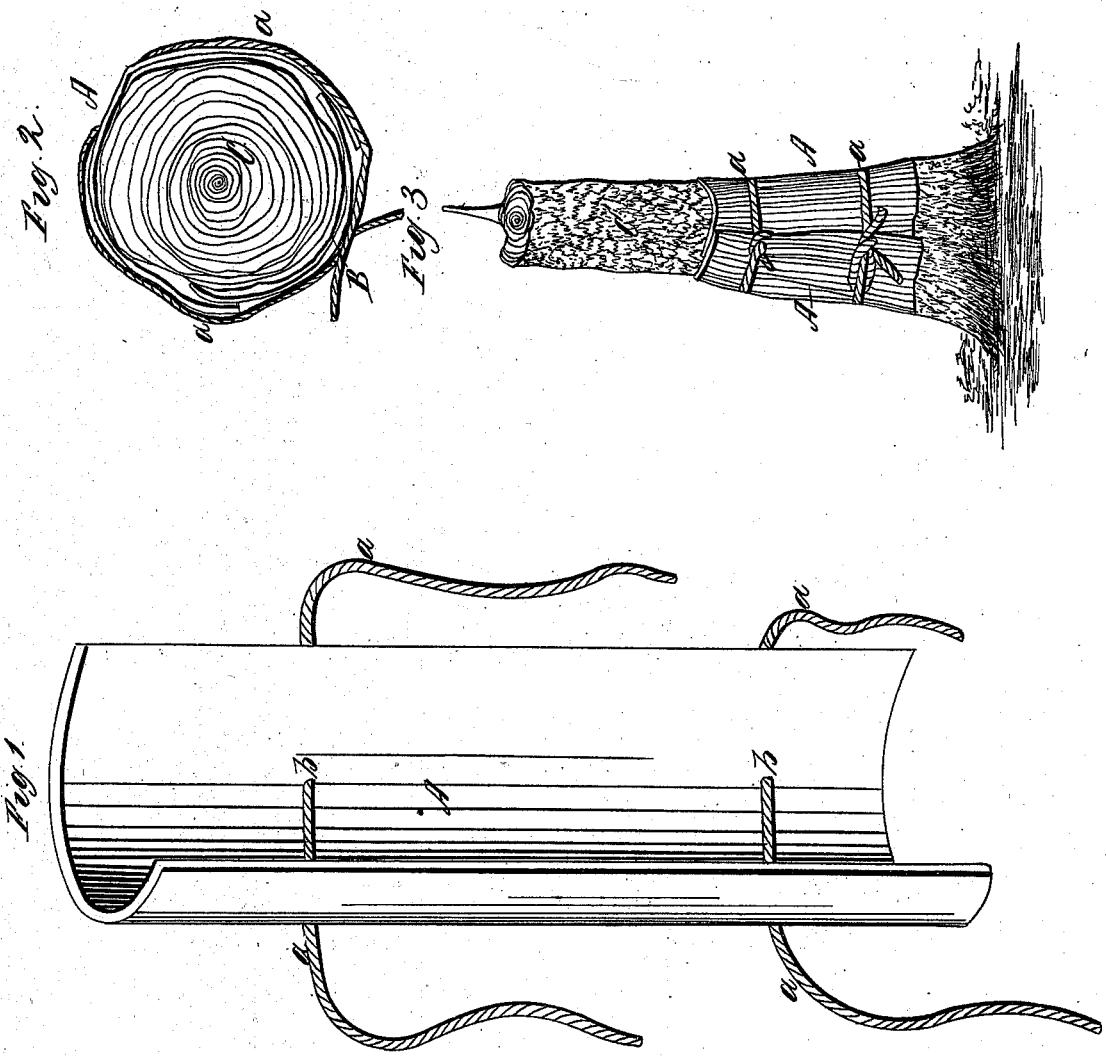
D. R. Prindle.
Tree and Plant Protector.
No. 107,960. Patented Oct. 4, 1870.

D. R. PRINDLE, OF EAST BETHANY, NEW YORK.

Letters Patent No. 107,960, dated October 4, 1870.

IMPROVEMENT IN TREE AND PLANT-PROTECTORS.

The Schedule referred to in these Letters Patent and making part of the same.

*To all whom it may concern:*

Be it known that I, D. R. PRINDLE, of East Bethany, in the county of Genesee and State of New York, have invented an Improved Tree, Shrub, and Plant-Protector; and I do hereby declare that the following is a full and exact description thereof, reference being had to the accompanying drawing making part of this specification—

Figure 1 being a view, in perspective, of the invention.

Figure 2, a horizontal thereof, as applied to a tree.

Figure 3, a view, in perspective, of the same, as applied to a tree.

Like letters designate corresponding parts in all of the figures.

My invention consists in a thin flexible sheet or strip of wood, having the desired length and any convenient breadth, so that one or more will bend into cylindrical form, and reach round a tree, shrub, or plant, on which it is fastened by strings, wires, or the equivalent thereof, for the purpose of protecting the tree or shrub from injury by animals, insects, the sun's heat, or by accident otherwise, the application and arrangement being substantially as follows:

The material is wood, cut in thin sheets or strips, selecting bass-wood, poplar, or some other wood that will easily cut into strips, and will bend readily without splitting. This material is very cheap and suitable, and, since I generally cover or saturate the same with oil, coal-tar, or other preservative substance, it is a sufficiently durable material. The preservative substance may also serve to make the wood flexible.

The strips A are to be of different lengths, according to circumstances, and cut in such widths as convenient, since a single strip may be wide enough to go around the tree, as in fig. 3, or two may serve to reach, as in fig. 2, and even more might be used, if necessary. In length, also, one or more may be used.

They are to be bent around the body of the tree or shrub C, as indicated in figs. 2 and 3, so as to entirely surround the same.

They are then secured in place by strings *a a*, or their equivalent.

These strings are simply inserted through holes *b b* in the strips, as indicated, and they are tied in knots.

The strips fit more or less loosely round the tree, and yield as the tree grows; and when, at any time, they get taut, by the expansion from the trees' growth, the strings are readily let out. Thus the article furnishes a complete protector, wherever applied, against the gnawing of animals, as sheep, goats, rabbits, and mice, as well as against the ravages of insects, and against the injury which may happen from the heat of the sun, and other cause or accident. At the same time it is cheap, convenient, and does not endanger the life and growth of the tree.

What I claim as my invention, and desire to secure by Letters Patent, is—

As a new article of manufacture, a tree or plant-protector, A, constructed of one or more thin, flexible sheets or shavings cut from wood, and saturated or prepared with an application of petroleum, or its equivalent, or not, as may be desired, substantially as herein specified and described.

The above specification of my improved tree and plant-protector signed by me this 22d day of March, 1869.

D. R. PRINDLE.

Witnesses:
 CHAS. SPRAGUE,
 D. R. PRINDLE, Jr.